(12) United States Patent
Ural et al.

(10) Patent No.: US 8,986,647 B2
(45) Date of Patent: Mar. 24, 2015

(54) HYDROPHILIC SILICONE COPOLYMERS USEFUL IN CARBON FIBER PRODUCTION

(75) Inventors: Goekhan Ural, Konigstein (DE); Michael W. Head, Charlotte, NC (US); Megan P. Powell, Ann Arbor, MI (US)

(73) Assignee: Wacker Chemical Corporation, Adrian, MI (US)

( * ) Notice: Subject to any disclaimer, the term of this patent is extended or adjusted under 35 U.S.C. 154(b) by 769 days.

(21) Appl. No.: 13/278,327

(22) Filed: Oct. 21, 2011

(65) Prior Publication Data
US 2013/0101494 A1    Apr. 25, 2013

(51) Int. Cl.
| | | |
|---|---|---|
| *D01F 9/12* | (2006.01) | |
| *D01F 9/22* | (2006.01) | |
| *D01D 5/06* | (2006.01) | |
| *C08G 77/46* | (2006.01) | |
| *D01D 5/096* | (2006.01) | |
| *D01F 6/38* | (2006.01) | |
| *C09D 183/10* | (2006.01) | |
| *C08G 77/458* | (2006.01) | |
| *C08G 77/12* | (2006.01) | |

(52) U.S. Cl.
CPC *D01D 5/06* (2013.01); *C08G 77/46* (2013.01); *D01D 5/096* (2013.01); *D01F 6/38* (2013.01); *D01F 9/225* (2013.01); *C09D 183/10* (2013.01); *C08G 77/458* (2013.01); *C08G 77/12* (2013.01)
USPC ............................. 423/447.2; 423/447.4

(58) Field of Classification Search
CPC ............ D01F 6/38; D01F 9/225; D01D 5/096
See application file for complete search history.

(56) References Cited

U.S. PATENT DOCUMENTS

| | | | |
|---|---|---|---|
| 3,308,109 A | | 3/1967 | Sampson et al. |
| 4,009,248 A | * | 2/1977 | Kishimoto et al. ......... 423/447.4 |
| 4,603,042 A | * | 7/1986 | Setsuie et al. .............. 423/447.4 |
| 4,698,413 A | | 10/1987 | Lynch et al. |
| 4,830,845 A | * | 5/1989 | Ogawa et al. .............. 423/447.2 |
| 4,944,932 A | * | 7/1990 | Shiromoto et al. ........ 423/447.6 |
| 5,073,275 A | * | 12/1991 | Ona et al. ..................... 252/8.81 |
| 5,226,923 A | * | 7/1993 | O'Lenick, Jr. ................ 8/115.6 |
| 5,269,984 A | | 12/1993 | Ono et al. |
| 5,286,563 A | * | 2/1994 | Takahashi et al. ............ 428/394 |
| 5,571,442 A | * | 11/1996 | Masaki et al. ................ 252/8.62 |
| 5,599,778 A | * | 2/1997 | Ishikawa et al. ............. 508/208 |
| 5,783,305 A | * | 7/1998 | Masaki et al. ................ 428/408 |
| 5,879,799 A | * | 3/1999 | Yosizato et al. .............. 428/364 |
| 6,171,516 B1 | * | 1/2001 | Inuzuka et al. .............. 252/8.82 |
| 6,652,599 B1 | * | 11/2003 | Inuzuka et al. ............. 8/115.51 |
| 2008/0075683 A1 | | 3/2008 | Herzig et al. |
| 2008/0152574 A1 | * | 6/2008 | Tanaka et al. .............. 423/447.2 |
| 2009/0263576 A1 | * | 10/2009 | Okabe et al. .................. 427/228 |
| 2010/0247911 A1 | | 9/2010 | Aso et al. |

OTHER PUBLICATIONS

U.S. Statutory Invention Registration, H1052, Peebles, Jr. et al., Published May 5, 1992.

* cited by examiner

*Primary Examiner* — Robert S Loewe
(74) *Attorney, Agent, or Firm* — Brooks Kushman P.C.

(57) ABSTRACT

Robust oiling agent compositions for use in preparing carbon fibers from acrylic polymer carbon fiber precursors contain at least one silicone copolymer minimally containing an organopolysiloxane moiety, a polyoxyalkylene polyether moiety, and at least one internal or terminal urea or urethane group.

20 Claims, No Drawings

HYDROPHILIC SILICONE COPOLYMERS USEFUL IN CARBON FIBER PRODUCTION

BACKGROUND OF THE INVENTION

1. Field of the Invention

The present invention pertains to carbon fiber production from polyacrylic polymer and copolymer fibers in which an oiling agent is used.

2. Description of the Related Art

Carbon fibers, also sometimes termed "graphite" fibers, are well known reinforcing agents in a variety of both inorganic and polymer composites, particularly the latter. Carbon fibers are prepared by the thermolytic treatment of organic substrates in fiber form. While there are numerous substrates from which carbon fibers may be formed, the predominant precursor fibers are pitch-based fibers and organic fibers, principally polyacrylic fibers, and in particular polyacrylonitrile ("PAN") homopolymer and copolymer fibers. Pitch-based fibers are comparatively less expensive, and have high modulus. However, their bending strength and tensile strength are low compared to PAN-based fibers. As used herein, carbon fiber precursor, "CFP" also include PAN-based fibers as well as other acrylic fibers suitable for carbon fiber production.

PAN-based carbon fibers are generally prepared by first providing PAN fibers. These fibers may be prepared by numerous processes, but most of these involve providing a high solids solution of the CFP in a suitable solvent such as dimethylsulfoxide, extruding this solution through a spinneret, and coagulation in an aqueous bath, which may also contain a water miscible organic solvent.

The coagulated fiber thus obtained is generally washed, and then drawn in hot water. An oiling agent is added to the fiber, generally after drawing, for further processing. The fibers, now coated with oiling agent, are heat treated to dry the fibers, and further drawn at high temperatures, for example using steam under pressure. The fibers are then oxidized at elevated temperature under tension in an oxidizing atmosphere, generally air, for example at 200° C. to 400° C. Following oxidation, the fibers are carbonized at increasing temperatures in the range of, for example, 400° C. to 1300° C. in a substantially non-oxidizing atmosphere, and graphitized at a temperature exceeding 2000° C. An example of such a process is disclosed in U.S. Pat. No. 5,269,984, which is incorporated herein by reference, as is also U.S. Pat. No. 4,698,413, which discloses a dry spinning process. U.S. Published Statutory Invention Registration H1052 (May 1992) discloses an improvement in these processes by including ammonia in the oxidizing atmosphere.

The fibers are often treated in the form of a fiber bundle or "tow." However, fusion may occur between single fibers in the stabilization step of converting the precursor fiber bundle into a stabilized fiber bundle, wherein the fusion may cause process failure such as fluffing and bundle breakage in the stabilization step and the subsequent carbonization step. It is known that applying an oiling agent to the precursor fiber bundle is important in avoiding this fusion, and a large number of oiling agent compositions have been utilized. For example, a silicone-based oiling agent in which an amino-modified silicone, an epoxy-modified silicone, a polyether-modified silicone or the like is frequently used as an oiling agent composition, due to both high heat resistance and effective suppression of fusion.

However, for silicone-based oiling agents composed mainly of silicone compounds, the silicone component undergoes a crosslinking reaction upon heating, resulting in an increase in viscosity. As a result, a viscous material derived therefrom may accumulate on the surfaces of fiber transporting rollers and guides in the precursor fiber bundle production process and in the stabilization step, and fiber bundles may be wound around or be caught in the rollers and guides, resulting in thread breakage, thereby leading to reduction in operability. Moreover, in oiling agent compositions containing silicone compounds, decomposition of the latter may produce silicon compounds such as silicon oxide, silicon carbide and silicon nitride in the heating step, and the scale thereby formed reduces the stability of the heating step and the quality of the product.

For this reason, non-silicone-based oiling agents have been proposed for many years for improving the operability of the heating step. Examples of non-silicone-based oiling agents include polybutenes, a blend of a polyoxyethylene higher aliphatic alkyl ethers, and an antioxidant, neopentyl alcohol derivatives, alkyl or alkenyl thio fatty acid esters polymeric amide compounds, ammonium salts of a fatty acid esters, fluorochemical surfactants, and aromatic esters and amides.

However, although non-silicone-based oiling agents have advantages such as no formation of silicon compounds in the heating step and use of inexpensive raw materials, these oiling agents are often poorer in thermal stability than silicone-based oiling agents, which causes fluffing and bundle breakage due to the fusion in the heating step. In addition, since the mechanical properties of the product carbon fiber bundle are also poorer than those produced with a silicone-based oiling agent, the use of non-silicone-based oiling agents for acrylic precursor fibers for carbon fibers is limited to a limited range of product classes.

It has also been proposed to reduce silicon compounds produced in the heating step derived from a silicone-based components by combining a silicone-based oiling agent and a non-silicone-based oiling agent. However, this technique is problematic in that the compatibility of silicone compounds with non-silicone compounds is low, and thus it is impossible to uniformly adhere a mixture of the silicone compound and the non-silicone compound to the surface of the precursor fiber bundle. As a result, prevention of fusion between single fibers has been insufficient where the non-silicone compound is unevenly distributed, e.g. where the silicone component is present in a small amount or is not substantially present, and it is thus difficult to stably obtain a carbon fiber bundle with excellent mechanical properties.

Furthermore, it has been proposed improve emulsion stability of the oiling agent by adding an alkylene oxide-modified silicone to an oiling agent containing a silicone and a non-silicone component. However, although an alkylene oxide-modified silicone has some stabilizing effect on the emulsion, the compatibility of the silicone and non-silicone components is still insufficient. As a result, adhesion of the oiling agent component to the precursor fiber bundle is not uniform, and fusion between single fibers cannot be completely prevented. Therefore, it has been difficult to stably obtain a carbon fiber bundle with excellent mechanical properties.

Thus, with respect to process stability and development of mechanical properties of carbon fiber bundles, the use of only non-silicone-based oiling agent compositions tends to be poorer than the use of an oiling agent composition using a silicone compound as the main component. Therefore, a high-quality carbon fiber bundle cannot be stably obtained. Further, when an oiling agent composition having a reduced content of silicone compound is used, it is difficult to uniformly adhere the silicone compound and the non-silicone compound to the surface of the precursor fiber bundle. Therefore, again, a high-quality carbon fiber bundle cannot be stably obtained. Thus, the problem of decreased operability due to formation of silicon compounds in the heating step stemming from a silicone-based oiling agent and the problem of reduction of mechanical properties of the carbon fiber bundle due to a non-silicone-based oiling agent are inextricably linked, and both of these problems have not been solved by the art.

In addition to preventing fusion, the oiling agent also provides lubrication, preventing snagging and breaking of fibers as they are drawn, and as they pass through the process to the carbonizing furnace. As indicated previously, numerous fiber finishes have been used in the past, but the selection of a suitable fiber finish is not straight forward, as first, the oxidized fibers have much different properties from the non-oxidized fibers; the fiber finish must be able to withstand the high temperature oxidative environment of the oxidizing furnace; and must not interfere with graphitic orientation nor the carbonization in the carbonizing furnace. Thus, many textile "oils" which include polyoxyalkylene polyethers, solutions and dispersions of waxes, and conventional silicones, including aminoalkyl-functional silicones and polyether silicones have not provided the desired results, or are in need of improvement. In the U.S. Pat. No. 5,269,984, for example, aminoalkyl-terminated organopolysiloxanes ("amine oils") are disclosed as an "oiling agent", and such amine oils continue to be used today. Such oils must generally be applied neat or dissolved in organic solvent. When supplied as a dispersion, a relatively large amount of emulsifier must be used to provide a stable dispersion (emulsion). The large amount of emulsifier may interfere with the oxidation and carbonization processes.

It would be desirable to provide a "robust" oiling agent for use in the production of carbon fibers from acrylic fibers, and particularly PAN-based organic fibers, which provides a stable and easily preparable emulsion, and which is compatible with additional silicone and non-silicone oiling agents and oiling agent components.

SUMMARY OF THE INVENTION

It has now been surprisingly discovered that robust oiling compositions suitable for use in preparing high quality carbon fibers from acrylic fibers may be prepared by incorporating, as a major oiling component, a silicone copolymer containing both polyether moieties and nitrogen-containing linkages derived from the reaction of organic isocyanates with an active-hydrogen-containing group of a polyether moiety, the nitrogen-containing linkages including at least one of urethane and urea linkages.

DETAILED DESCRIPTION OF THE PREFERRED EMBODIMENTS

The carbon fiber precursor (CFP) fibers of the present invention are organic polymers which are carbonizable to carbon fibers. By the term "organic fibers" is meant polymer fibers prepared by conventional spinning techniques, but does not include fibers prepared from pitch. The organic polymers are preferably acrylic fibers, and most preferably PAN fibers, the PAN being either a homopolymer or copolymer with other copolymerizable monomers. The method of preparation of the fibers is conventional, and either dry spinning or wet spinning techniques may be employed. The method of preparation of the CFP fibers is not an aspect of the invention.

Following spinning of the fibers, the fibers are contacted with the inventive oiling agent. Conventional contacting methods can be used, for example spraying, application from foam covered rolls, hollow Godet rolls, and the like, but is preferably applied by dip bath techniques in which the fibers are guided through a bath of the inventive fiber finish. The take-up of the oiling agent composition onto the fibers, based on "solids," i.e. exclusive of solvent, may be adjusted within a wide range, and is preferably from 0.2 weight percent to about 5 weight percent, more preferably 0.5 weight percent to about 4 weight percent, and most preferably between 1 and 2.5 weight percent; based on fiber weight. By "oiling agent" is meant the total composition to be applied to the fibers, including silicone copolymer, antistat, softener, emulsifier, preservative, any other additives, and liquid phase in which these ingredients are present. Water is the usual predominant liquid phase component.

Following application to the CFP fibers, processing may continue as usual, or the fibers may be subjected to a drying step to remove water and other volatile liquids from the fibers.

The CFP fibers are then oxidized by conventional means, for example by heating in air, preferably under tension. The heating temperature is conventional, and to some degree fiber-dependent, but generally within the range of 150° C. to 400° C., more preferably 200° C. to 300° C. The tension may be relaxed following an initial period of oxidation. Oxidation is preferably conducted in a gas mixture preferably containing 5 to 30 volume percent oxygen, preferably at least 10% by volume of oxygen, more preferably at least 15 volume percent oxygen. The oxidation gas may further contain ammonia in an amount of 2 to 95 volume percent, preferably 20 to 40 volume percent.

Following oxidation, the oxidized and partially oriented fibers are carbonized conventionally, for example first at a temperature within the range of 400° C. to 1500° C. in an inert atmosphere, preferably argon or nitrogen, and then graphitized at a higher temperature, for example above 2000° C., preferably from 2100° C. to 2500° C., and most preferably at about 2350° C. to 2450° C. Graphitization also takes place in an inert atmosphere. The carbonization and graphitization furnaces may be separate from one another, or may be a single furnace, with the higher temperature regions separated from the lower temperature regions by appropriate baffles, for example partitions which have holes or slits through which the fibers pass. The fibers are generally also kept under tension during graphitization so that shortening of the fiber does not occur. The fiber finish is volatized or decomposed in the carbonization and/or graphitization.

More specifically relating to the CFP and carbon fiber production process, in the present invention, an acrylic fiber bundle spun by known method can be used as the acrylic fiber bundle before adhering an oiling agent composition thereto. Examples of preferred acrylic fiber bundles include acrylic fiber bundles obtained by spinning acrylonitrile-based polymers. The acrylonitrile-based polymer is a polymer obtained from acrylonitrile as a main monomer and polymerizing the monomer. The acrylonitrile-based polymer may be a homopolymer obtained only from acrylonitrile, or an acrylonitrile-based copolymer in which other monomers are used in addition to acrylonitrile which is the main component.

The content of acrylonitrile units in the acrylonitrile-based copolymer is preferably 96.0 to 98.5 wt % from the viewpoint of preventing thermal fusion of fibers in the heating step, providing for heat resistance of the copolymer, stability of a spinning dope and the quality of the resulting carbon fibers. An acrylonitrile content of 96 wt % or more is preferred, in that fibers are not liable to be thermally fused in the heating step where the fibers are converted to carbon fibers, and excellent quality and performance of the carbon fiber product is achieved. Further, since the heat resistance of the copolymer itself is relatively high, adhesion between single fibers can be avoided in steps such as drying or drawing of precursor fibers by heated rollers or pressurized steam in the spinning of the fibers. On the other hand, an acrylonitrile content of 98.5 wt % or less is preferred, so that the solubility of the copolymer solvent is maintained; the stability of the spinning dope can be maintained; the precipitation and coagulation properties of the copolymer are not increased; and stable production of the precursor fiber is achieved.

When a copolymer is used, a monomer other than acrylonitrile is suitably selected from vinyl monomers copolymerizable with acrylonitrile. Such monomers are preferably selected from monomers having the effect of promoting stabilization such as acrylic acid, methacrylic acid, itaconic acid, and alkali metal or ammonium salts thereof, and acrylamide. As a vinyl monomer that can be copolymerized with acrylonitrile, a carboxyl group-containing vinyl monomer such as acrylic acid, methacrylic acid, and itaconic acid is more preferred. The content of the carboxyl group-containing vinyl monomer unit in the acrylonitrile-based copolymer is preferably 0.5 to 2.0 wt %. One or more other monomers may be employed.

In the case of spinning, the acrylonitrile-based polymer is dissolved in a solvent to prepare a spinning dope. The solvent for preparing the spinning dope can be any conventionally used solvents, such as dimethylacetamide, dimethyl sulfoxide, and dimethylformamide. Dimethylacetamide, dimethyl sulfoxide, and dimethylformamide, which provide rapid coagulation are preferred from the viewpoint of productivity, dimethylacetamide being more preferred.

In order to obtain a dense coagulated-yarn, it is preferred to prepare a spinning dope so that the polymer concentration of the spinning dope may be increased to the extent possible. Specifically, the polymer concentration in the spinning dope is preferably 17 wt % or more, more preferably 19 wt % or more. In addition, since the spinning dope requires proper viscosity and fluidity, the polymer concentration is preferably does not exceed 25 wt %.

Known spinning methods can be employed such as wet spinning method in which the spinning dope is directly spun into a coagulation bath, or the dry spinning method in which the spinning dope is coagulated in the air, or a dry-wet spinning method in which the spinning dope is once spun in the air and then coagulated in a bath. For obtaining a carbon fiber bundle having higher performance, the wet spinning method or the dry-wet spinning method is preferred.

Spinning and shaping by a wet spinning method or a dry-wet spinning method can be performed by spinning the above spinning dope into a coagulation bath from a nozzle having a hole with a circular section. An aqueous solution containing the solvent used for the spinning dope is preferably used as the coagulation bath from the viewpoint of the ease of solvent recovery. When an aqueous solution containing a solvent is used as a coagulation bath, the concentration of the solvent in the aqueous solution is preferably 50 to 85 wt % because this concentration can form a dense structure without voids to provide a high-performance carbon fiber bundle, can ensure drawability, and provides excellent productivity. The temperature of the coagulation bath is preferably 10 to 60° C.

The coagulated fiber can be subjected to drawing in a bath, in the coagulation bath or in a drawing bath. Alternatively, part of the coagulated fiber may be drawn in air followed by drawing in a bath, and may be washed with water before or after drawing or simultaneously with drawing, to obtain a fiber in a water-swollen state. Generally, drawing in a bath is preferably performed in a water bath of 50 to 98° C. once or in multiple stages, and a total draw ratio of drawing in the air and drawing in a bath of 2 to 10 times is preferred in terms of the performance of the resulting carbon fiber bundle.

The oiling agent composition can be applied to the acrylic fiber bundle by applying an emulsion of the oiling agent composition to the acrylic fiber bundle in a water-swollen state after drawing in a bath. When the acrylic fiber bundle is washed after drawing in a bath, the emulsion of the oiling agent composition can also be applied to the fiber bundle in a water-swollen state obtained after the bundle is subjected to drawing and washing.

Note that the oiling agent composition may optionally contain an antioxidant in the present invention as necessary. Various known antioxidants can be used, but phenolic antioxidants and sulfur-based antioxidants are preferred. Specific examples of phenolic antioxidants include 2,6-di-t-butyl-p-cresol, 4,4'-butylidenebis-(6-t-butyl-3-methyl phenol), 2,2'-methylenebis-(4-methyl-6-t-butylphenol), 2,2'-methylenebis-(4-ethyl-6-t-butylphenol), 2,6-di-t-butyl-4-ethylphenol, 1,1,3-tris(2-methyl-4-hydroxy-5-t-butylphenyl)butane, n-octadecyl-3-(3,5-di-t-butyl-4-hydroxyphenyl)propionate, tetrakis[methylene-3-(3,5-di-t-butyl-4-hydroxyphenyl)propionate]methane, triethylene glycol bis[3-(3-t-butyl-4-hydroxy-5-methylphenyl)propionate], and tris(3,5-di-t-butyl-4-hydroxybenzyl)isocyanurate. Examples of sulfur-based antioxidants include dilauryl thiodipropionate, distearyl thiodipropionate, dimyristyl thiodipropionate, and ditridecyl thiodipropionate. The antioxidant may be used independently or may be used as a mixture of a plurality of antioxidants.

In the present invention, the oiling agent composition optionally, but preferably contains an antistatic agent for improving the properties thereof. Known materials can be used as the antistatic agent. The antistatic agents may be classified into ionic and nonionic antistatic agents. Ionic antistatic agents include anionic, cationic, and amphoteric antistatic agents, and nonionic antistatic agents include polyethylene glycol and polyhydric alcohol antistatic agents. From the viewpoint of antistatic effectiveness, ionic antistatic agents are preferred, and examples include aliphatic sulfonates, higher alcohol sulfates, higher alcohol ethylene oxide adduct sulfates, higher alcohol phosphates, higher alcohol ethylene oxide adduct sulfate-phosphates, quaternary ammonium salt-type cationic surfactants, betaine-type amphoteric surfactants, higher alcohol ethylene oxide adduct polyethylene glycol fatty acid esters, and polyhydric alcohol fatty acid esters. These may be used independently or in combination.

In addition, in order to improve process stability and stability and adhesion characteristics of the oiling agent composition, additives such as defoaming agents, biocides, and penetrants may be suitably blended with the oiling agent composition depending on the equipment and the service conditions for adhering the oiling agent composition to the acrylic fiber bundle. A useful defoamer is HQ50E available from Wacker Chemical Corporation, Adrian, Mich., an emulsion of an 8000 cps aminoalkyl-functional polydimethylsiloxanes and a silicone polyether, also containing about 1% of hydrophilic fumed silica. Emulsion stability is achieved with a blend of sorbitan monostearate emulsifiers. Many other defoaming agents are known and useful. Defoamers with no silica content are to be preferred. Defoamers are generally present in very small amounts, for example 0.05 weight percent to about 1 weight percent, more preferably 0.1 weight percent to about 0.5 weight percent and thus a relatively small amount of silica in the defoamer composition is tolerable. It is preferable that the least amount of defoamer which is effective to prevent foam or reduce foam to manageable levels be employed. The same is true of ingredients such as biocides.

To apply the oiling agent compositions to the precursor fiber bundle in a water-swollen state, ion exchange or other high purity water is added to the emulsion in which the oiling agent composition is dispersed in water to thereby dilute the emulsion to a predetermined concentration to form an oiling agent treatment emulsion, which is then adhered to the precursor fiber bundle in a water-swollen state. The undiluted emulsion preferably contains 10 to 60 weight percent of the silicone copolymer based on the weight of the emulsion.

Conventional methods for adhering the oiling agent treatment solution to the precursor fibers in a water-swollen state can be used, such as roller adhesion in which the lower part of a roller is immersed in an oiling agent-applying solution and the precursor fiber bundle is brought into contact with the upper part of the roller; guide adhesion in which a certain amount of oiling agent-applying solution is discharged from a guide through a pump and the precursor fiber bundle is brought into contact with the surface of the guide; spray adhesion in which a certain amount of oiling agent-applying solution is sprayed from a nozzle to the precursor fiber bundle; and dip adhesion in which the precursor fiber bundle is immersed in an oiling agent-applying solution and then squeezed with a roller or the like to remove excess oiling agent composition. From the viewpoint of uniform adhesion, dip adhesion in which the oiling agent treatment solution is sufficiently permeated into the fiber bundle and excess treatment solution is removed is preferred. For more uniformly adhering the oiling agent, it is effective to divide oiling agent application into multiple steps having two or more stages to apply the oiling agent repeatedly.

In the present invention, the precursor fiber bundle to which the oiling agent composition has been adhered is dried and densified in a subsequent drying step. It is preferable to perform the drying and densification at a temperature exceeding the glass transition temperature of the fiber, but the glass transition temperature is substantially different depending on the water content of the fiber from a water-containing state to a dry state. Therefore, it is preferable to perform drying and densification by using a heated roller at a temperature of about 100 to 200° C. In this method, the number of heating rollers may be one or more.

Drying is preferably followed by pressurized steam drawing because the density and degree of orientation of the fiber can be further enhanced. Pressurized steam drawing involves drawing fibers in a pressurized steam atmosphere. Since this method allows a high-ratio, it allows higher and more stable spinning and contributes to improvement in the density and degree of orientation of the fiber.

In pressurized steam drawing, it is preferable to control the temperature of the heating roller immediately before the pressurized steam drawing apparatus within a range from 120 to 190° C., and control the variability of the vapor pressure in the pressurized steam drawing within 0.5% or less. This allows suppression of variations in the draw ratio of the fiber bundle and resulting variability of tow fineness. If the temperature of the heating roller is less than 120° C., the temperature of the precursor fiber bundle may not be sufficiently high, resulting in reduction in the drawability of fiber.

The pressure of steam in pressurized steam drawing is preferably 200 kPa or more (gauge pressure), so that suppression of drawing by the heating rollers and drawing by the pressurized steam is effective. It is preferable to balance steam pressure with treatment time. However, since steam leakage may be increased when high pressure is applied, the steam pressure is preferably about 600 kPa or less.

The fiber bundle which has completed drying and densification is passed through rolls at room temperature, cooled to ordinary temperature, and then wound into a bobbin by a winder. Alternatively, the fiber bundle is transferred into a can and stored and then moved to the heating step.

The use of the inventive oiling agent composition for acrylic precursor fibers for producing carbon fibers suppresses fusion in spinning and heating, and allows production of carbon fiber bundles with excellent quality and physical properties. In addition, since scattering of silicone compound decomposition products in the heating step and the amount of silicon decomposition compounds produced is minimal overall operability and operability at each step are significantly improved. Thus, the oiling agent composition has both the effects of providing stable production as well as excellent carbon fiber physical properties. The carbon fiber bundle produced by properly applying the oiling agent composition to the precursor fiber bundle as described, is suitable for use as a reinforcement fiber for fiber reinforced resin composite materials used for various structural materials.

The hydrophilic copolymers of the present invention contain organopolysiloxane moieties and polyether moieties, linked through urea or urethane linkages. Such copolymers may be prepared by reacting a polyether glycol-functionalized polyorganosiloxane with a di- or polyisocyanate. If an excess of isocyanate groups are present, the resulting polymers may be capped by reacting with an active hydrogen-containing (isocyanate-reactive) moiety which may be monomeric, oligomeric, or polymeric. For example, the "capping agent" may be a hydroxyl-terminated polymer such as a polyoxyalkylene glycol, a polyoxyalkylene glycol monoether, or hydroxyl-terminated polyester, among many choices, or, in the case of monomeric products, may be an alkyl or aryl amine, alkanol amine alcohol, thiol, or the like. The aim is to eliminate residual isocyanate functionality. In this respect, it is preferable to employ the isocyanate at no more than a 1:1 molar amount based on isocyanate groups and isocyanate-reactive groups, or to use a deficiency of isocyanate groups. In such cases, capping is not generally necessary.

Preferably, the hydrophilic silicone copolymers are prepared by reacting, in a first step, organopolysiloxanes (1) which have at least one silicon-bonded hydrogen atom per molecule, preferably at least two silicon-bonded hydrogen atoms, with substantially linear oligometric or polymeric compounds (2) of the general formula $$R^1\text{-}(A\text{-}C_nH_{2n})_m\text{-}A^1\text{-}H \qquad (I)$$

where $R^1$ is a monovalent optionally substituted hydrocarbyl radical capable of adding Si—H groups in a hydrosilylation reaction, preferably a hydrocarbyl radical having an aliphatic carbon-carbon multiple bond, A is a bivalent polar organic radical selected from the group consisting of —O—, —C(O)—O—, —O—C(O)—, —O—C(O)—O—, —C(O)—NH—, —NH—C(O)—, urethane radical and urea radical, preferably an oxygen atom —O—, $A^1$ is a bivalent polar organic radical selected from the group consisting of —O—, —NH— and —NR'— (where R' is a monovalent hydrocarbyl radical of 1 to 18 carbon atoms), preferably an oxygen atom —O—, n is an integer from 1 to 20, preferably 1 to 4 and more preferably 2 or 3, m is equal to 0 or a positive integer, preferably 5 to 50, and a second step, reacting the resulting H-$A^1$-group-containing intermediates (4) with organic compounds (5), which have two or more isocyanate groups per molecule.

Preferably, the water content of the compounds (1) and (2) used for preparing the silicone copolymers of the present invention is less than 2000 ppm by weight, preferably less than 1500 ppm and more preferably less than 1000 weight ppm, all based on the total weight of compounds (1) and (2). The water content is based on room temperature (20° C.) and the pressure of the ambient atmosphere (1020 hPa).

The siloxane copolymers of the present invention preferably have a viscosity of 1000 to 100,000,000 mPas at 25° C. and more preferably 10,000 to 10,000,000 mPas at 25° C.

The first step of the process preferably utilizes linear, cyclic or branched organopolysiloxanes (1) comprising units of the formula $$R_e H_f SiO_{\frac{4-e-f}{2}} \quad (II)$$

where
R in each occurrence may be the same or different and is a monovalent optionally substituted hydrocarbyl radical having 1 to 18 carbon atoms per radical,
e is 0, 1, 2 or 3,
f is 0, 1 or 2,
and the sum total of e+f is 0, 1, 2 or 3,
with the proviso that each molecule has at least one silicon-bonded hydrogen atom and preferably 2 or more silicon-bonded hydrogen atoms.

Preferred organopolysiloxanes (1) have the general formula $$H_g R_{3-g} SiO(SiR_2O)_o(SiRHO)_p SiR_{3-g} H_g \quad (III)$$

where R is as defined above,
g is 0, 1 or 2,
o is 0 or an integer from 1 to 1500, and
p is 0 or an integer from 1 to 200,
with the proviso that each molecule has at least one silicon-bonded hydrogen atom and preferably two or more silicon-bonded hydrogen atoms.

Formula (III) of this invention is to be understood as meaning that the o units of —(SiR$_2$O)— and the p units of —(SiRHO)— may form any desired distribution in the organopolysiloxane molecule.

It is most preferable for g in the formula (III) to be 1, for p in the formula (III) to be 0 and for α,ω-dihydropolydiorganosiloxanes and especially α,ω-di-hydropolydimethylsiloxanes to be used as organopolysiloxanes (1).

The organopolysiloxanes (1) preferably have an average viscosity of 10 to 1000 mPa·s at 25° C., more preferably 50 to 1000 mPa·s at 25° C. and most preferably 60 to 600 mPa·s at 25° C.

Examples of R radicals are alkyl radicals such as methyl, ethyl, n-propyl, isopropyl, 1-n-butyl, 2-n-butyl, isobutyl, tert-butyl, n-pentyl, isopentyl, neopentyl, and tertpentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as the o-, m-, and p-tolyl radicals, xylyl radicals and ethylphenyl radicals; and aralkyl radicals such as the benzyl, α-phenylethyl and β-phenylethyl radicals.

Examples of substituted R radicals are haloalkyl radicals such as the 3,3,3-trifluoro-n-propyl, 2,2,2,2',2',2'-hexafluoroisopropyl, and heptafluoroisopropyl radicals and haloaryl radicals such as the o-, m- and p-chlorophenyl radicals.

The R radical is preferably a monovalent hydrocarbyl radical of 1 to 6 carbon atoms, methyl being particularly preferred.

Examples of R radicals fully apply to R' radicals.

R$^1$ is preferably a monovalent hydrocarbyl radical possessing an aliphatic carbon-carbon multiple bond. Examples of R$^1$ radicals are alkenyl radicals such as the vinyl, 5-hexenyl, cyclohexenyl, 1-propenyl, allyl, 3-butenyl and 4-pentenyl radicals, and alkynyl radicals such as the ethynyl, propargyl and 1-propynyl radicals. The R$^1$ radical is preferably an alkenyl radical, especially ω-alkenyl, and the allyl radical is most preferred.

Preference for use as oligomeric or polymeric compounds (2) is given to aliphatic unsaturated alcohols of the formula $$H_2C=CH-R^2-(OC_nH_{2n})_m-OH \quad (IV)$$

where R$^2$ is a bivalent hydrocarbyl radical of 1 to 20 carbon atoms, preferably a radical of the formula —CH$_2$—, —CH(CH$_3$)— or —C(CH$_3$)$_2$— and
n and m are each as defined above.

Preferred examples of polyethers (2) are those of the general formula $$H_2C=CH-R^2-(OCH_2CH_2)_a[OCH_2CH(CH_3)]_b-OH \quad (IV')$$

where R$^2$ is as defined above and
a and b are 0 or an integer from 1 to 200, with the proviso that the sum total of a+b is not less than 1, and is preferably from 5 to 50.

Further examples of oligomeric or polymeric compounds (2) are unsaturated polyesters, such as $H_2C=CH-R^2-[O(O)CC_nH_{2n}]_m-OH$, unsaturated polycarbonates, such as $H_2C=CH-R^2-[OC(O)OC_nH_{2n}]_m-OH$, and unsaturated polyamides, such as $H_2C=CH-R^2-[NHC(O)C_nH_{2n}]_m-NH_2$, where R$^2$, n and m are each as defined above. Preference for use as monomeric compound (2) is given to unsaturated compounds of the formula $$H_2C=CH-R^2-OH,$$

where R$^2$ is as defined above and preferably in this case a radical of the formula $$-(CH_2)_n-$$

where n is as described. Preferred monomeric compounds (2) are allyl alcohol, 5 hexenol and 7-octenol.

The amounts in which the compounds (2) are used in the first step are preferably in the range from 1.0 to 4.0 and preferably from 1.3 to 2.5 mol of R$^1$ radical, which is preferably a radical having an aliphatic carbon-carbon multiple bond and preferably is an ω-alkenyl radical, per gram atom of silicon-bonded hydrogen in organopolysiloxane (1). Monomeric compound (2) used in excess can either be left in the reaction mixture or be removed, partly or wholly, by distillation, if its volatility allows it.

The first step preferably utilizes catalysts (3) to promote the addition of silicon-bonded hydrogen onto aliphatic unsaturation. Useful catalysts (3) for the process of the present invention include all catalysts which promote the addition of silicon-bonded hydrogen onto aliphatic unsaturation. The catalysts are preferably a metal from the group of the platinum metals or a compound or complex from the group of the platinum metals. Examples of such catalysts are metallic and finely divided platinum, which may be on supports such as silicon dioxide, aluminum oxide or activated carbon, compounds or complexes of platinum, such as platinum halides, examples being $PtCl_4$, $H_2PtCl_6.6H_2O$, $Na_2PtCl_4.4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6.6H_2O$ and cyclohexanone, platinum-vinylsiloxane complexes, such as platinum-1,3-divinyl-1,1,3,3-tetramethyldisiloxane complexes with or without detectable inorganically bound halogen, bis(gammapicoline)platinum dichloride, trimethylenedipyridine-platinum dichloride, dicyclopentadieneplatinum dichloride, dimethylsulfoxideethyleneplatinum(II) dichloride, cyclooctadieneplatinum dichloride, norbornadieneplatinum dichloride, gamma-picoline-platinum dichloride, cyclopentadieneplatinum dichloride, and also reaction products of platinum tetrachloride with olefin and primary amine or secondary amine or primary and secondary amine, such as the reaction product of platinum tetrachloride dissolved in 1-octene with sec-butylamine or ammonium-platinum complexes.

The amount in which catalyst (3) is used in the first step is preferably in the range from 1 to 50 weight ppm (parts by weight per million parts by weight) and more preferably in amounts of 2 to 20 weight ppm, all calculated as elemental platinum and based on the total weight of organopolysiloxanes (1) and compounds (2). The catalyst may be added in one or more increments.

The first step of the process is preferably carried out at the pressure of the ambient atmosphere i.e., at 1020 hPa absolute, but can also be carried out at higher or lower pressures. Furthermore, the first step of the process is preferably carried out at a temperature in the range from 60° C. to 140° C. and more preferably at a temperature in the range from 80° C. to 120° C.

The second step of the process preferably utilizes organic compounds (5), which have two or more isocyanate groups per molecule, of the formula $$O=C=N-R^3-N=C=O \quad (V)$$

where $R^3$ is a bivalent hydrocarbyl radical having 4 to 40 carbon atoms per radical.

Examples of organic compounds (5) are hexamethylene 1,6-diisocyanate, isophorone diisocyanate, tolylene 2,4-diisocyanate, tolylene 2,6-diisocyanate, phenylene 1,3-diisocyanate, 4,4'-methylenebis(cyclohexyl isocyanate), 4,4'-methylenebis(phenyl isocyanate) and dimethylphenyl diisocyanate.

The amount in which organic compounds (5) are used in the second step is preferably in the range from 0.5 to 1.0 mol and more preferably in the range from 0.8 to 1.0 mol of isocyanate group per mole of $H-A^1$ group in the intermediate (4).

The reaction in the second step of the process according to the present invention preferably utilizes metal-containing condensation catalysts (6), such as di-n-butyltin dilaurate, tin(II) octoate, dibutyltin diacetate, potassium octoate, zinc dilaurate, bismuth trilaurate, or tertiary amines such as dimethylcyclohexylamine, dimethylaminopropyldipropanolamine, pentamethyldipropylenetriamine, N-methyl-imidazole or N-ethylmorpholine.

A preferred siloxane copolymer is obtained by a first step of reacting an α,ω-dihydropolydiorganosiloxane (1) in excess with a polyether (2) of the formula (IV) and a second step of reacting the intermediate (4), an HO-polyether-polysiloxane-polyether-OH, with a diisocyanate (5) of the formula (V) to introduce urethane groups into the siloxane copolymer. In the process, free polyether from the 1st step is also bound by urethane formation:

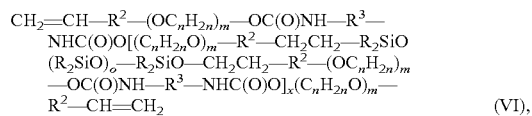

where R, $R^2$, $R^3$, n, m and o are each as defined above and x is 0 or an integer from 1 to 20, preferably 0 or an integer from 1 to 4.

The urethane groups in the hydrophilic siloxane copolymers of the present invention can act as donors and acceptors in the formation of hydrogen bonds.

The second step of the process according to the present invention, in addition to the organic compounds (5), may utilize still further compounds (7) which are reactive toward isocyanate groups. Examples of further compounds (7) are those selected from the group of formulae $$R^4-(A-C_nH_{2n})_m-A^1-H \quad (VII),$$

$$HO-R^5-NR^4-R^5-OH \quad (VIII),$$

$$HO-R^5-NR^4_2 \quad (IX),$$

$$HO-R^6(NR^4_2)_2 \quad (X),$$

$$HO-R^7-(NR^4_2)_3 \quad (XI),$$

$$(HO)_2R^6-NR^4_2 \quad (XII), \text{ and}$$

$$-HNR^4_2 \quad (XIII)$$

where $R^4$ is a hydrogen atom or an R radical which may optionally contain one or more nitrogen atoms, $R^5$ is a bivalent hydrocarbyl radical having 1 to 10 carbon atoms per radical, $R^6$ is a trivalent organic radical having 1 to 100 carbon atoms per radical, preferably a trivalent hydrocarbyl radical having 1 to 100 carbon atoms, which optionally contains one or more non-adjacent oxygen atoms, $R^7$ is a tetravalent organic radical having 1 to 100 carbon atoms per radical, preferably a tetravalent hydrocarbyl radical having 1 to 100 carbon atoms which optionally contains one or more non-adjacent oxygen atoms, and $A^1$, n and m are each as defined above.

Examples of compounds of the formula (VII) are methylpolyethylene oxide, butylpolyethylene oxide, methylpolyethylene oxide/polypropylene oxide and methylpolypropylene oxide, i.e. monoethers of polyoxyalkylene glycols.

Examples of compounds of the formula (VIII) are N-methyldiethanolamine, N-methyldipropanolamine, dimethylamino-propyldipropanolamine, N-dodecyldiethanolamine and N-stearyldipropanolamine.

Examples of compounds of the formula (IX) are N,N-dimethylethanolamine, N,N-diethylpropanolamine, N,N-dimethyl-aminopropylmethylethanolamine and dimethyl-2-(2-aminoethoxy)ethanol.

Examples of compounds of the formula (X) are 1,5-bis(dimethylamino)-pentan-3-ol, 1,5-bis(methylamino)pentan-3-ol, 1,7-bis(dimethylamino)heptan-4-ol and N,N-bis(3-dimethylaminopropyl)-N-isopropanolamine.

Examples of compounds of the formula (XI) are 2,4,6-tris(dimethylaminomethyl)phenol, 1,1,1-tris(dimethylaminomethyl)methanol and 2,4,6-tris(dimethylaminomethyl)cyclohexanol.

Examples of compounds of the formula (XII) are N,N-bis(dimethylaminopropyl)-3-aminopropane-1,2-diol, N,N-bis (dimethylaminopropyl)-2-aminopropane-1,3-diol, N,N-bis (3-dimethylaminopropyl)carbaminomonoglyceride.

Examples of compounds of the formula (XIII) are dibutylamine, octylamine, benzylamine, 3-(cyclohexylamino)propylamine, 2-(diethylamino)ethylamine, dipropylenetriamine, isophoronediamine, dimethylaminopropylmethylamine, aminopropylmorpholine, N,N-bis(dimethylaminopropyl)amine, dimethylaminopropylamine.

Compounds of the formula (VIII) to (XIII) provide a way of incorporating protonatable nitrogen in the siloxane copolymer.

Compounds of the formula (VII) are used in the second step in amounts of preferably 0 to 2 mol and more preferably 0 to 1 mol of H-$A^1$ group per mole of H-$A^1$ group in compound (2).

Compounds of the formula (VIII) are used in the second step in amounts of preferably 0 to 2 mol and more preferably 0 to 1 mol of HO group per mole of H-$A^1$ group in compound (2).

Compounds of the formula (IX) are used in the second step in amounts of preferably 0 to 2 mol and more preferably 0 to 1 mol of HO group per mole of H-$A^1$ group in compound (2).

Compounds of the formula (X) are used in the second step in amounts of preferably 0 to 2 mol and more preferably 0 to 1 mol of HO group per mole of H-$A^1$ group in compound (2).

Compounds of the formula (XI) are used in the second step in amounts of preferably 0 to 2 mol and more preferably 0 to 1 mol of HO group per mole of H-$A^1$ group in compound (2).

Compounds of the formula (XII) are used in the second step in amounts of preferably 0 to 2 mol and more preferably 0 to 1 mol of HO group per mole of H-$A^1$ group in compound (2).

Compounds of the formula (XIII) are used in the second step in amounts of preferably 0 to 2 mol and more preferably 0 to 1 mol of HN group per mole of H-$A^1$ group in compound (2).

Polyisocyanate (5) is preferably used in deficiency—even in the presence of compounds (7)—to ensure that all the isocyanate groups, which pose a potential health hazard, will safely react. The amounts in which organic compounds (5) are used in the second step are therefore preferably in the range from 0.5 to 1.0 mol, more preferably in the range from 0.8 to 1.0 mol of isocyanate group per mole of the sum total of isocyanate-reactive functions from the sum total of intermediate (4) and compounds (7), and most preferably 0.8 to less than 1.0 mol of isocyanate groups.

The second step is preferably carried out at the pressure of the ambient atmosphere, i.e., at 1020 hPa (absolute), but can also be carried out at higher or lower pressures. Furthermore, the second step is preferably carried out at a temperature in the range from 40° C. to 140° C. and more preferably at a temperature in the range from 60° C. to 100° C.

To reduce the product viscosities, which may be high in some instances, low molecular weight materials, such as alcohols or ethers, can be added if appropriate. Examples thereof are ethanol, isopropanol, n-butanol, 2-butoxyethanol, diethylene glycol monobutyl ether, tetrahydrofuran, diethylene glycol diethyl ether and dimethoxyethane, of which diethylene glycol monobutyl ether is a preferred example. Preferred quantities added in the case of very viscous products are up to 50% by weight and more preferably up to 30% by weight, based on the hydrophilic silicone copolymers of the present invention. The use of such additives also has the advantage that the resultant products are easier to disperse in water than the pure silicone copolymers.

The siloxane copolymers of the present invention are easy to disperse in water without further auxiliaries, such as emulsifiers, i.e., are self-dispersing, and produce emulsions and especially microemulsions. The silicone copolymers can thus be made, depending on the choice of stoichiometry, water-soluble or self-emulsifying (so-called "self-emulsifying systems"), i.e., they require no further, auxiliary agents for emulsification when emulsifiers are needed, they are generally necessary in only small amounts, thus reducing any effect they might have on processing and carbonization of the CFPs into high quality carbon fibers. Suitable emulsifiers, when necessary, include all those conventionally used, including non-ionic emulsifiers such as those based on polyoxyalkylene polyether glycols, optionally capped with hydrophobic end group(s) such as alkyl ethyl or alkyl ester groups, cationic emulsifiers, anionic emulsifiers, or zwitterionic emulsifiers. Silicone/polyether emulsifiers are also possible.

Owing to their cationogenicity and polarity, due to the number of amino, carbamide and urea groups in the molecule, the copolymers of the present invention adhere very effectively to the CFPs, and provide robust, stable oiling agent compositions. The siloxane copolymers can therefore be used for example as constituents of emulsions, in solution or solventlessly for the treatment of CFPs.

Example 1

491 g of an α,ω-dihydropolydimethylsiloxane having 0.055% by weight of silicon-bonded hydrogen and a water content of 50 weight ppm are mixed with 1001 g of an allyl alcohol ethoxylate/propoxylate of the formula

having an a:b ratio=1.0, a water content of 978 weight ppm and an iodine number of 13.7 (the iodine number indicates the amount of iodine, in grams, consumed in the course of the addition onto the aliphatic unsaturation per 100 grams used of material to be investigated), and the mixture is heated to 100° C. and then has metered into it 0.28 g of a 2.7% by weight (based on elemental platinum) solution of a platinum 1,3-divinyl-1,1,3,3-tetramethyldisiloxane complex in an α,ω-divinyldimethylpolysiloxane having a viscosity of 1000 mPa·s at 25° C., a solution of Karstedt's catalyst (the preparation of which is described in U.S. Pat. No. 3,775,452). The temperature of the reaction mixture rises by about 6° C., whereupon the same amount of catalyst is metered in again. The reaction mixture then turns homogeneous. After an hour's reaction time at 100 to 110° C., a sample of the polyether-polysiloxane intermediate is cooled down and found to have a viscosity of 2220 mm²/s at 25° C.

45.5 g of hexamethylene 1,6-diisocyanate (1.0 mol of isocyanate group per mole of HO group in the intermediate) are then metered in at 100° C., and urethane formation is catalyzed with 100 mg of di-n-butyltin dilaurate. After two hours at 100° C., the clear reaction product is cooled down. Its viscosity is about 100,000 mPa·s at 25° C.

40 g of the highly viscous oil are mixed with 60 g of water at 50° C. The product is readily emulsifiable and forms an opalescent microemulsion having a urethane content of 0.14 meq./g.

Example 2

960 g of the α,ω-dihydropolydimethylsiloxane having a water content of 50 weight ppm from Example 1 are mixed with 536 g of a polyether of the formula

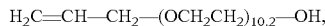
$H_2C=CH-CH_2-(OCH_2CH_2)_{10.2}-OH$, having a water content of 686 weight ppm, and heated to 100° C. 0.28 g of Karstedt's catalyst solution described in Example 1 is then added, whereupon the temperature of the reaction mixture rises to 19° C. and a clear product is formed. Complete conversion of the silicon-bonded hydrogen is achieved after one hour at 100 to 110° C. The polyether-polysiloxane intermediate has a viscosity of 760 mm$^2$/s at 25° C.

63 g of N-methyldiethanolamine (1.02 mol of HO group per mole of HO group in the polyether) and 178 g of hexamethylene diisocyanate (0.99 mol of isocyanate group per mole of the sum total of HO groups in the intermediate and the N-methyldiethanolamine) are then metered in successively. Urethane formation is catalyzed with 100 mg of di-n-butyltin dilaurate. After the batch has been held at 100° C. for 2 hours it is cooled down and 64 g of acetic acid are added at 70° C. The clear, brownish product has a viscosity of 120,000 mPa·s at 25° C.

40 g of the highly viscous oil are mixed with 60 g of water at 50° C. Gentle stirring produces a microemulsion having a urethane content of 0.39 meq./g and an amine number of 0.12 (the amine number is the number of ml of 1N HCl needed to neutralize 1 g of substance).

Example 3

1411 g of the allyl alcohol ethoxylate/propoxylate of Example 1 are mixed with 813 g of an α,ω-dihydropolydimethylsiloxane having 0.052% by weight of silicone-bonded hydrogen and heated to 100° C. with thorough stirring. Identical catalysis provides a polyether-polysiloxane intermediate having a viscosity of 2490 mm$^2$/s at 25° C. after a reaction time of one hour.

At 100° C., 83 g of N,N-bis(3-dimethylaminopropyl)-N-isopropanolamine are stirred in and 92 g of hexamethylene diisocyanate are metered in. The ratio of NCO groups to the sum total of NCO-reactive organic groups is 0.995 or, taking into account the water present therein, just 0.87. A somewhat exothermic reaction is followed by heating to 120° C., at which point 50 mg of dibutyltin laurate are added and the reaction is allowed to proceed for a further 3 hours until isocyanate is no longer detectable in the IR, while the viscosity increases at the same time. The oil, which is very viscous at 25° C., has a basic nitrogen content of 0.42 meq./g.

Example 4

635 g of the α,ω-dihydropolydimethylsiloxane of Example 3 are reacted with 205 g of a polyether of the formula

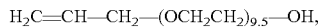
$H_2C=CH-CH_2-(OCH_2CH_2)_{9.5}-OH$, as in Example 2. The polyether-polysiloxane intermediate has an OH concentration of 0.512 meq./g and contains 177 ppm of water.

200 g of this intermediate are mixed with 10.3 g of bis(dimethylaminopropyl)amine and heated to 84° C.; 13.2 g of hexamethylene diisocyanate are metered in. The ratio of NCO groups to the sum total of NCO-reactive organic functions is 0.998 or, if water is included, 0.97. Complete conversion of the isocyanate groups is achieved in one hour at about 90° C. in a slightly exothermic reaction without further catalysis. The polymer mixture contains 0.49 meq. of basic nitrogen per gram.

32 g of this polymer are neutralized with a solution of 1.04 g of acetic acid in 8 g of diethylene glycol monobutyl ether. A slightly yellowish microemulsion forms spontaneously with 60 g of water after stirring with a spatula.

Example 5

200 g of the polyether-polysiloxane intermediate prepared in Example 4 (0.512 meq. of OH/g) are admixed with an additional 26.2 g of the polyether used in the synthesis of the intermediate and also with 14.8 g of bis(dimethylaminopropyl)amine and heated to 80° C. The addition of 19.8 g of hexamethylene diisocyanate immediately starts a moderately exothermic reaction, which ends after about 2 hours at 90° C., and isocyanate is no longer detectable. The ratio of NCO to the sum total of NCO-reactive groups (OH, NH) is 0.995 when water is not included and only 0.97 when the water present therein is included. The highly viscous polymer mixture has a basic nitrogen concentration of 0.60 meq./g.

A microemulsion is produced by neutralizing 32 g of this product with a solution of 1.29 g of acetic acid in 8 g of diethylene glycol monobutyl ether and then adding 60 g of water with stirring.

Example 6

200 g of the polyether-polysiloxane intermediate prepared in Example 4 (0.512 meq. of OH/g) and just 4.5 g of bis(dimethylaminopropyl)amine are heated to 88° C. without further additions of polyether. The addition of 10.6 g of hexamethylene diisocyanate starts a slightly exothermic reaction. The ratio of NCO groups to the sum total of NCO-reactive organic functions is 0.998 or, including to the water present in the reaction mixture, 0.97. Isocyanate is no longer detectable after 1 hour at 100° C. The highly viscous polymer has a basic nitrogen content of 0.22 meq./g.

A stable microemulsion is obtained by neutralizing 32 g of basic product with a solution of 0.46 g of acetic acid in 8 g of diethylene glycol monobutyl ether and adding 60 g of water with stirring.

Example 7

Example 2 is repeated, replacing the N-methyldiethanolamine in stage 2 by 99 g of bis(dimethylaminopropyl)amine. The amount of hexamethylene diisocyanate is reduced to 131 g (0.98 mol of isocyanate per mole of the sum total of isocyanate-reactive OH and NH groups). Following complete conversion of all isocyanate groups, the batch is neutralized with 70 g of acetic acid and diluted with 450 g of diethylene glycol monobutyl ether. At a polymer content of 80%, this solution has a viscosity of 4900 mm$^2$/s at 25° C. and an amine number of 0.47.

A total of 60 g of water is stirred a little at a time into 40 g of this solution at room temperature to form a fine emulsion having an amine number of 0.19.

Example 8

Compared with Example 7, this example utilizes reduced amounts of raw materials which are monofunctional with regard to isocyanate. The polyether is reduced from 536 g to 402 g and the amine from 99 g to 50 g. Accordingly, the reaction mixture contains 1.06 mol of isocyanate-reactive groups, which reduces the amount of hexamethylene diisocyanate to 87 g. Neutralization is effected with 35 g of acetic acid. Diluting with 384 g of diethyleneglycol monobutyl ether gives a clear 80% amino PUR silicone polyether solution of 5100 mm²/s (25° C.), which has an amine number of 0.28. This solution is emulsified similarly to Example 7. The fine emulsion formed has an amine number of 0.113.

Example 9

960 g of the α,ω-dihydropolydimethylsiloxane of Example 1 are reacted with 125 g of a polyether of the formula

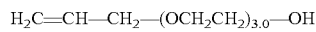

having a water content of 780 weight ppm, as described there. After complete conversion of the silicon-bonded hydrogen, the product is heated at 140° C. under reduced pressure to obtain 1060 g of a clear α,ω-dihydroxysiloxane copolymer. 70 g of bis(dimethylaminopropyl)amine and 74 g of hexamethylene diisocyanate are added thereto in succession at 100° C. After two hours at 100° C., all the NCO groups have reacted, and the batch is neutralized with 49 g of acetic acid and diluted with 313 g of diethylene glycol monobutyl ether for simpler handling. The 80% formulation has a viscosity of 2200 mm²/s (25° C.) and an amine number of 0.35. The emulsification similarly to Example 7 gives a fine emulsion of amine number 0.14.

Example 10

1492 g of the polyether polysiloxane intermediate of Example 1 are mixed with 51 g of bis(dimethylaminopropyl)amine and 67 g of hexamethylene diisocyanate at 100° C. The slightly exothermic reaction gives complete conversion of the NCO groups after two hours. Neutralization with 35 g of acetic acid and further dilution with 410 g of diethylene glycol monobutyl ether gives a clear formulation having a viscosity of 7800 mm²/s (25° C.) and an amine number of 0.26. 60 g of water are easily stirred into 40 g of this dilution. The aqueous formulation has an amine number of 0.104.

Example 11

An oiling composition was prepared by dispersing in reverse osmosis water, 25.60 weight percent of a silicone copolymer of the invention, available from Wacker Chemical Corporation, Adrian, Mich., as WETSOFT® NE 810, 0.08 weight percent of AMA 415 preservative, a mixture of 2-methyl-4-isothiazolin-3-one and 5-chloro-2-methyl-4-isothiazolin-3-one, 1.0 weight percent of POMOCO C2DQ, antistat, and 0.25 weight percent of HQ50E defoamer, available from Wacker Chemical Corporation. The dispersion was storage stable.

Example 12

An acrylic fiber bundle to which the oiling agent composition is to be adhered is prepared in the following manner. An acrylonitrile-based copolymer (composition ratio: acrylonitrile/acrylamide/methacrylic acid=96/3/1 (mass ratio)) is dissolved in dimethylacetamide to prepare a spinning dope. The spinning dope is discharged into a coagulation bath filled with an aqueous dimethylacetamide solution from a spinning nozzle having a pore size (diameter) of 75 μM and a number of holes of 6000 to obtain a coagulated yarn or "tow." The coagulated yarn is introduced into a water washing tank to remove the solvent and is drawn to 5 times the initial length to obtain an acrylic fiber bundle in a water-swollen state.

The acrylic fiber bundle in a water-swollen state is introduced into an oiling agent treatment tank containing an oiling agent composition obtained by diluting the undiluted oiling agent composition of Example 11 with ion exchange water to adhere the oiling agent composition thereto. Then, the resulting acrylic fiber bundle is dried and densified with a drying roll having a surface temperature of 180° C. and then is drawn to 3 times the initial length with steam at a pressure of 0.2 MPa. The precursor fiber bundle has good bundling properties and constant tow width.

This acrylic precursor fiber bundle for carbon fibers is then passed through a stabilizing furnace having a temperature gradient of 220 to 260° C. and is heated in a carbonization furnace having a temperature gradient of 400 to 1300° C. in a nitrogen atmosphere to form a carbon fiber bundle.

Comparative Example 13

The precursor fiber bundle was produced and heated to form a carbon fiber bundle in the same manner as in Example 12 except that the oiling agent composition in which the oiling agent composition contained a conventional aminoalkyl-functional silicone oil emulsified by a non-ionic polyoxyethylenepolyoxypropylene surfactant, in a weight ratio of 4:1. Although bundling properties and the number of fusions were satisfactory, a large amount of silicon degradation products were formed, resulting in reduced operability.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a process for preparing carbon fibers from acrylic fibers wherein an oiling agent is applied to the acrylic fibers prior to carbonization, the improvement comprising:
    applying at least once to the acrylic fibers, an oiling agent composition comprising a silicone copolymer containing at least one organopolysiloxane moiety, at least one polyoxyalkylene ether moiety, and at least one linking or terminal group comprising a urea group or urethane group.

2. The process of claim 1, wherein the silicone copolymer is prepared by the process comprising:
    reacting, in a first step, organopolysiloxane(s) (1) which have at least one silicon-bonded hydrogen atom per molecule, with substantially linear oligomeric or polymeric compounds (2) of the formula

where R¹ is a monovalent optionally substituted hydrocarbyl radical capable of hydrosilylation,
A is a bivalent polar organic radical selected from the group consisting of —O—, —C(O)—O—, —O—C(O)—, —OC(O)—O—, —C(O)—NH—, —NH—C(O)—, urethane radicals, and urea radicals,
A¹ is a bivalent polar organic radical selected from the group consisting of —O—, —NH— and —NR'— where R' is a monovalent hydrocarbyl radical of 1 to 18 carbon atoms,
n is an integer from 1 to 20, and
m is 0 or a positive integer, to form a H-A¹-group-containing intermediate compound (4) and, reacting, in a second step, the resulting H-A¹-group-containing intermediate (4) with at least one organic compound (5) which has two or more isocyanate groups per molecule, wherein the mole equivalents of isocyanate groups are less than or equal to the mole equivalents of isocyanate-reactive groups.

3. The method of claim 2, wherein the second step utilizes at least one further compound selected from the group consisting of the formulae $$R^4\text{-}(A\text{-}C_nH_{2n})_m\text{-}A^1\text{-}H \quad \text{(VII)},$$

$$HO\text{—}R^5\text{—}NR^4\text{—}R^5\text{—}OH \quad \text{(VIII)},$$

$$HO\text{—}R^5\text{—}NR^4_2 \quad \text{(IX)},$$

$$HO\text{—}R^6(NR^4_2)_2 \quad \text{(X)},$$

$$HO\text{—}R^7\text{—}(NR^4_2)_3 \quad \text{(XI)},$$

$$(HO)_2R^6\text{—}NR^4_2 \quad \text{(XII), and}$$

$$\text{—}HNR^4_2 \quad \text{(XIII)}$$

where R⁴ is a hydrogen atom or an R radical which may optionally contain a nitrogen atom, R⁵ is a bivalent hydrocarbyl radical having 1 to 10 carbon atoms per radical, R⁶ is a trivalent organic radical having 1 to 100 carbon atoms per radical, which optionally contains one or more oxygen atoms, and R⁷ is a tetravalent organic radical having 1 to 100 carbon atoms per radical, which optionally contains one or more oxygen atoms.

4. The method of claim 2, wherein the siloxane copolymers have the formula $$\begin{aligned}
&CH_2\text{=}CH\text{—}R^3\text{—}(OC_nH_{2n})_m\text{—}OC(O)NH\text{—}R^2\text{—}\\
&NHC(O)O[(C_nH_{2n}O)_m\text{—}R^3\text{—}CH_2CH_2\text{—}R_2SiO\\
&(R_2SiO)_o\text{—}R_2SiO\text{—}CH_2CH_2\text{—}R^3\text{—}(OC_nH_{2n})_m\\
&\text{—}OC(O)NH\text{—}R^2\text{—}NHC(O)O]_x(C_nH_{2n}O)_m\text{—}\\
&R^3\text{—}CH\text{=}CH_2 \quad \text{(IV)}
\end{aligned}$$

where R in each occurrence is the same or different and is a monovalent, optionally substituted hydrocarbyl radical having 1 to 18 carbon atoms per radical, R² is a bivalent hydrocarbyl radical of 1 to 10 carbon atoms, R³ is a bivalent hydrocarbyl radical having 4 to 40 carbon atoms per radical, n is an integer from 1 to 20, m is equal to 0 or a positive integer, o is 0 or an integer from 1 to 1500, and x is 0 or an integer from 1 to 20.

5. The process of claim 2, wherein R is methyl.

6. The process of claim 2, wherein all R are methyl, and the isocyanate is 1,6-hexanediisocyanate.

7. The process of claim 2, wherein the oiling agent further comprises at least one of an antistat, a biocide preservative, and a defoamer.

8. The process of claim 1, wherein the silicone copolymer is applied in the form of an aqueous emulsion.

9. The process of claim 1, wherein the oiling agent further comprises at least one of an antistat, a biocide preservative, and a defoamer.

10. The process of claim 1, wherein the oiling composition is applied to the acrylic fibers in an amount of 0.5 to 4 weight percent based on the total weight of solids in the oiling agent composition and the weight of the fibers.

11. The process of claim 1, wherein the oiling agent composition further contains an emulsifier.

12. The process of claim 1, wherein the oiling agent composition further contains a further organopolysiloxane other than the silicone copolymer.

13. The process of claim 12, wherein the further organosiloxane is selected from the group consisting of aminoalkyl-functional organopolysiloxanes, non-functional organopolysiloxanes, polyether-functional organopolysiloxanes, and epoxyalkyl-functional organopolysiloxanes.

14. The process of claim 1, wherein the oiling agent is applied to the acrylic fibers prior to a low temperature oxidation step.

15. The process of claim 1, wherein the oiling agent is in the form of an aqueous emulsion containing from 10 to 60 weight percent of silicone copolymer based on the total weight of the emulsion prior to dilution to a working strength.

16. The process of claim 15, wherein the aqueous emulsion contains an antistat and a defoamer.

17. A carbon fiber precursor comprising acrylic fibers coated with an oiling agent as described in claim 1, which has been oxidized.

18. The carbon fiber precursor of claim 17 which has been oxidized at a temperature in the range of 200° C. to 400° C.

19. The carbon fiber precursor of claim 17 which has been additionally carbonized.

20. A carbon fiber, prepared by graphitizing the carbon fiber precursor of claim 19.

* * * * *